United States Patent
Gudauskayte et al.

(10) Patent No.: US 12,530,868 B2
(45) Date of Patent: Jan. 20, 2026

(54) SYSTEMS AND METHODS FOR MEDICAL IMAGE ANALYSIS AND CLASSIFICATION

(71) Applicant: Remedy Logic Inc., New York, NY (US)

(72) Inventors: Evelina Gudauskayte, New York, NY (US); Vladislav Tumko, New York, NY (US); Andrej Rusakov, New York, NY (US)

(73) Assignee: Remedy Logic Inc., New York, NY (US)

( * ) Notice: Subject to any disclaimer, the term of this patent is extended or adjusted under 35 U.S.C. 154(b) by 416 days.

(21) Appl. No.: 18/332,625

(22) Filed: Jun. 9, 2023

(65) Prior Publication Data

US 2023/0401822 A1    Dec. 14, 2023

Related U.S. Application Data

(60) Provisional application No. 63/351,231, filed on Jun. 10, 2022.

(51) Int. Cl.
*G06V 10/764*    (2022.01)
*G06V 10/762*    (2022.01)
(Continued)

(52) U.S. Cl.
CPC .......... *G06V 10/764* (2022.01); *G06V 10/762* (2022.01); *G06V 20/70* (2022.01);
(Continued)

(58) Field of Classification Search
CPC ..... G06F 18/214; G06F 18/213; G06N 3/045; G06N 3/08; G06N 3/04; G06N 3/126; G06N 3/0464; G06N 3/048; G06T 2207/20081; G06T 2207/20084; G06T 7/0012; G06T 2207/10056; G06T 2207/30044; G06T 2207/10068; G06T 2207/20016; G06T 2207/20076; G06T 2207/30092; G06T 2207/30096;
(Continued)

(56) References Cited

U.S. PATENT DOCUMENTS

| 8,917,268 B2 | 12/2014 | Johnsen et al. |
| 10,509,090 B2 | 12/2019 | Krueger et al. |

(Continued)

FOREIGN PATENT DOCUMENTS

| CN | 105741293 | 7/2016 |
| CN | 107491633 | 12/2017 |

(Continued)

*Primary Examiner* — Manuchehr Rahmjoo
(74) *Attorney, Agent, or Firm* — Fox Rothschild LLP

(57) ABSTRACT

Systems and methods for performing image classification are disclosed. The methods include receiving a plurality of magnetic resonance imaging (MM) images that each include metadata. The plurality of images are sorted into one or more groups using the metadata. The methods further include, for each of the one or more groups: identifying a subset of images, generating for a classification label for each image in the subset of images using a classifier, identifying a first classification label that is associated with a maximum number of images in the subset of images, and assigning the first classification label to each image in that group.

19 Claims, 6 Drawing Sheets

(51) Int. Cl.
*G06V 20/70* (2022.01)
*G16H 30/20* (2018.01)
*G16H 30/40* (2018.01)

(52) U.S. Cl.
CPC ............ *G16H 30/20* (2018.01); *G16H 30/40* (2018.01); *G06V 2201/03* (2022.01); *G06V 2201/10* (2022.01)

(58) Field of Classification Search
CPC ........ G06V 10/82; G06V 20/69; G06V 10/25; G06V 10/44; G06V 10/48; G06V 20/58; G06V 20/584; G16H 30/40
See application file for complete search history.

(56) References Cited

U.S. PATENT DOCUMENTS

| | | |
|---|---|---|
| 10,699,163 B1 | 6/2020 | Shah et al. |
| 10,949,966 B2 | 3/2021 | Lo et al. |
| 10,949,968 B2 | 3/2021 | Brestel et al. |
| 2020/0285906 A1 | 9/2020 | Do et al. |
| 2021/0158526 A1 | 5/2021 | Patil et al. |
| 2021/0383533 A1 | 12/2021 | Zhao et al. |
| 2022/0343178 A1* | 10/2022 | Hall ..................... G06N 3/08 |

FOREIGN PATENT DOCUMENTS

| | | |
|---|---|---|
| CN | 108427951 | 8/2018 |
| CN | 111583204 | 8/2020 |
| CN | 111667027 | 9/2020 |
| CN | 111724893 | 9/2020 |
| CN | 113888470 | 1/2022 |
| CN | 113888520 | 1/2022 |
| WO | 2021210723 | 10/2021 |

* cited by examiner

SYSTEMS AND METHODS FOR MEDICAL IMAGE ANALYSIS AND CLASSIFICATION

CLAIM OF PRIORITY

This application also claims priority to U.S. Provisional Appl. No. 63/351,231 filed on Jun. 10, 2022, the disclosure of which is incorporated herein by reference in its entirety.

BACKGROUND

Magnetic resonance imaging (MRI) produces high quality images from inside the human body based on the principles of nuclear magnetic resonance. The images are based on variations in the phase and frequency of radio frequency (RF) radiation absorbed and emitted by the imaged subject. The radiation interacts with those nuclei that spin, in particular hydrogen nuclei, which are single protons, causing them to produce a magnetic signal. The spinning proton itself can be regarding as a magnet that produces a magnetic field, and it is displaced from an equilibrium position by the signal from the imaging apparatus. By varying the sequence of RF pulses applied & collected, different types of images can be created. Repetition Time (TR) is the amount of time between successive pulse sequences applied to the same slice. Time to Echo (TE) is the time between the delivery of the RF pulse and the receipt of the echo signal.

Tissue can be characterized by two different relaxation times—T1 and T2. T1 (longitudinal relaxation time) is the time constant which determines the rate at which excited protons return to equilibrium. It is a measure of the time taken for spinning protons to realign with the external magnetic field. T2 (transverse relaxation time) is the time constant which determines the rate at which excited protons reach equilibrium or go out of phase with each other. It is a measure of the time taken for spinning protons to lose phase coherence among the nuclei spinning perpendicular to the main field. The time constant which characterizes the return to equilibrium of a transverse magnetization resulting from the displacement is referred to as a spin-spin relaxation time is denoted by T2. An image whose intensity contrast is predominantly caused by differences in T2 of the tissues is referred to as a T2 weighted image. A T1-weighted image is a basic pulse sequence in magnetic resonance (MR) imaging and depicts differences in signal based upon intrinsic T1 relaxation time of various tissues.

Despite the widespread use of MRI imaging, there is a lack of an automated process for determining the sequence type (e.g., T1, T2, etc.), imaging parameters, and/or other information of the MM images to be processed, and is often retrieved from a standard data format such as the Digital Imaging and Communications in Medicine (DICOM) format. However, the information included in DICOM may not be accurate and often a skilled technician is required to provide and/or verify the information.

This document describes methods and systems that are directed to addressing the problems described above, and/or other issues.

SUMMARY OF THE INVENTION

This document describes systems and methods for performing image classification are disclosed. In various scenarios, the methods may include receiving a plurality of magnetic resonance imaging (MRI) images that each include metadata. The plurality of images may be sorted into one or more groups using the metadata. The methods may further include, for each of the one or more groups: identifying a subset of images, generating for a classification label for each image in the subset of images using a classifier, identifying a first classification label that is associated with a maximum number of images in the subset of images, and assigning the first classification label to each image in that group.

Optionally, the classification label may include a sequence type label, an anatomy label, and/or a view type label.

In various implementations, the metadata may be retrieved from a DICOM header of that image.

In certain implementations, sorting the plurality of images into one or more groups may include sorting the images such that each image in a group includes an attribute value that is either similar to corresponding attribute values of other images in the group and/or within a threshold of the corresponding attribute values. Optionally, the metadata may include, for example, one or more of the following attributes: patient attributes, pre-clinical or clinical study attributes, MRI scanner identification, series instance UID, series number, series description, protocol name, series time of acquisition, image pixels, image plane, weighting classification, time of acquisition of image, imaged organ identification, disease model, patient orientation, view type, slice thickness, or bolus magnetic contrast agent bolus identity. Additionally and/or alternatively, identifying the subset of images may include determining a median attribute value of an attribute for images included in that group, and selecting images that are within a threshold distance of the median attribute value. In some implementations, the methods may also include selecting an attribute for sorting the plurality of images into one or more groups where the selected attribute may be configured to maximize a number of the one or more groups.

In various implementations, the subset of images may include an odd number of images.

In various implementations, the methods may also include identifying and discarding, one or more of the plurality of images that are in a format that is not DICOM compatible.

In various implementations, the methods may also include storing the first classification label in association with each image in that group in a data representation.

In one or more implementations, identifying the subset of images may include selecting images that lie within a threshold pixel distance of an imaging plane corresponding to the group of images (based on a corresponding patient orientation).

Implementing systems of the above-described methods for image classification can include, but are not limited to, a processor and a non-transitory computer-readable storage medium comprising programming instructions that are configured to cause the processor to implement a method for image classification. Optionally, the programming instructions may be included in a computer program product.

DETAILED DESCRIPTION

Figure 1:
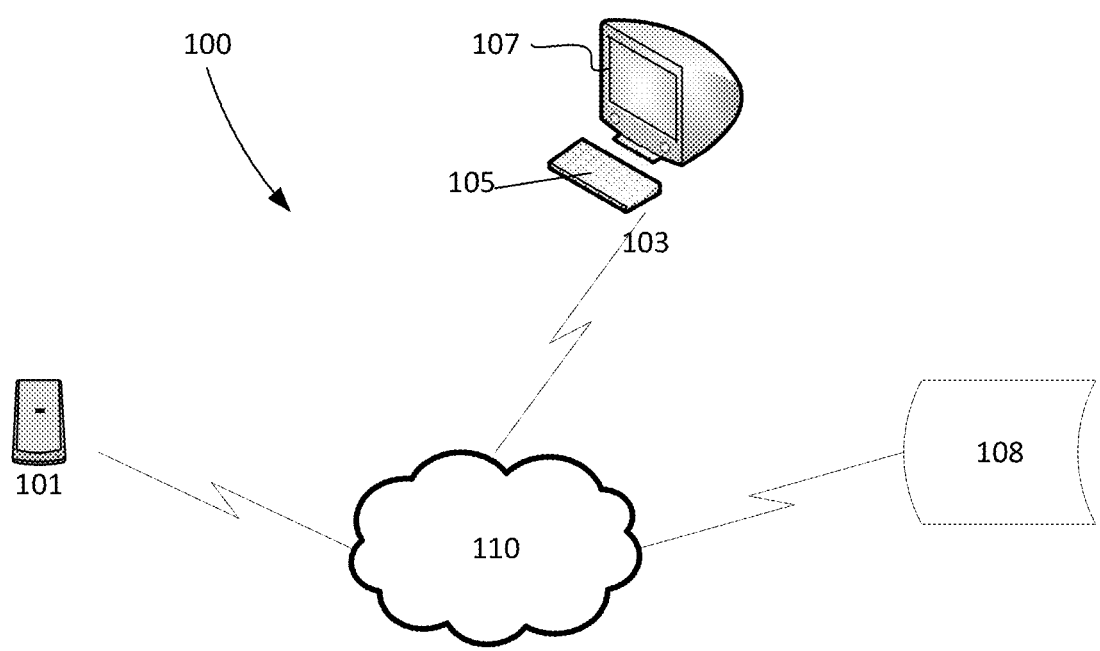
FIG. 1 illustrates an example high-level overview of an MRI system.

While this description is directed to processes related to medical images, the methods and systems described herein may also be used in conjunction with non-medical images, such as, images of circuit boards, airplane wings, and satellite images, for example. Accordingly, medical images may also be referred to herein simply as "images."

Herein, an "image slice" can refer to one of a plurality of cross-sectional images of a medical scan (i.e., a full scan of any type), one of a plurality of images taken from different angles of the medical scan, and/or the single image of the medical scan that includes only one image. Furthermore "plurality of image slices" can refer to all of the images of the associated medical scan, and refers to only a single image if the medical scan includes only one image.

Image characteristic refers to any characteristic related to display of an image. Includes without limitation, image angle (e.g., an angle of an image with reference to a standard one or more planes of human anatomy; also referred to herein as "scan plane"), anatomical position (and/or location) (e.g., a location, with reference to a standard one or more planes of human anatomy, of the patient represented in a particular image), image orientation (e.g., an orientation of the image with reference to a standard one or more planes of human anatomy), image rotation (e.g., a rotation of the image with reference to a standard one or more planes of human anatomy), image field of view, slice thickness, image window and/or level (e.g., a contrast of the image, a brightness of the image, and/or the like), image color map (e.g., that includes information for rendering different pixel intensities as different colors), other color characteristics, image opacity (and/or opacity map), image zoom level, image cropping information, and/or the like. In some instances, one or more image characteristics may be user defined and/or based on user preferences. Image characteristics are also referred to herein as image "attributes." Further examples of attributes are described below. An attribute refers to any characteristic associated with a data item (e.g., a data item such as a medical exam, an image series, a medical image, and/or the like). Attributes may be inherited in a hierarchical manner. For example, a medical image may inherit attributes of an image series of which it is a part, and an image series may inherit attributes of a medical exam of which it is a part. Attributes may be stored as part of an associated data item (e.g., as metadata, DICOM header data, etc.) and/or separately from an associated data item.

Magnetic resonance imaging (MM) uses non-ionizing radiation to create diagnostic useful images. An MRI scanner includes a large and very strong magnet in which the patient lies. A radio wave antenna is used to send signals to the body and then receive signals back. These returning signals are converted into MM images by a computer attached to the scanner. Imaging of almost any part of a human body can be obtained in any plane. MM image contrast is influenced by several characteristics of tissues and other materials including: T1, T2 and T2* relaxation as well as spin density, susceptibility effects and flow effects. A voxel represents a single sample, or data point, in an MRI image.

MRI images can be taken in three different views, projections or orientation: sagittal or side-view; coronal or front view; axial or cross-sectional view. Moreover, MRI images are taken in small sections called slices. Each slice has a relatively thin width but covers the whole area in each particular view. The width can be varied depending on how strong the magnetic field is and how detailed an image needs to be. Furthermore, slice selection in MRI is the selection of spins in a plane through the object. The slices to be imaged are selected by manipulating field gradients and pulse sequences to provide images in the usual sagittal, coronal or transverse (axial) planes. Thus it is known to vary the static magnetic field with gradient pulses applied during the application of RF (Larmor) frequency pulses to select the imaging planes. These slices (or images) are taken as shown in each view to create a stack of slices that is called a series of slices (also referred to as series of images herein). Each voxel of an MRI image of the human body contains one or more tissues.

MR sequences are a way to determine the composition of different areas of the body. MR sequence types depend on the imaging modalities prescribed for treatment planning of a given patient. The most common MRI sequence types are a T1-weighted sequence, a T2-weighted sequence, a Fluid Attenuated Inversion Recovery (Flair) sequence, a Diffusion weighted imaging (DWI) sequence, a T1-weighted post-gadolinium contrast agent (T1Gd) sequence, a Gradient Echo (e.g., T2*-weighted) sequence, a proton density weighted (PD) sequence, a steady-state free precession (SSFP) sequence, Short Tau Inversion Recovery (STIR) sequence, a double inversion recovery (DIR) sequence, an apparent diffusion coefficient (ADC) sequence, a diffusion tensor (DTI) sequence, a dynamic susceptibility contrast (DSC) sequence, a dynamic contrast enhanced (DCE) sequence, an arterial spin labeling (ASL) sequence, a blood-oxygen-level dependent (BOLD) sequence, a time-of-flight (TOF) sequence, a phase-contrast magnetic resonance angiography (MRA) sequence, or other MRI sequence, with or without contrast.

T1-weighted image sequences are produced by using short TE and TR times. The contrast and brightness of the image are predominately determined by T1 properties of tissue. Conversely, T2-weighted image sequences are produced by using longer TE and TR times. In these images, the contrast and brightness are predominately determined by the T2 properties of tissue. A third commonly used sequence is the Fluid Attenuated Inversion Recovery (Flair). The Flair sequence is similar to a T2-weighted image except that the TE and TR times are very long. Diffusion weighted imaging (DWI) is another sequence that is designed to detect the random movements of water protons. Water molecules diffuse relatively freely in the extracellular space; their movement is significantly restricted in the intracellular space. Spontaneous movements, referred to as diffusion, rapidly become restricted in ischemic brain tissue. During ischemia, the sodium-potassium pump shuts down and sodium accumulates intracellularly. Water then shifts from the extracellular to the intracellular space due to the osmotic gradient. As water movement becomes restricted intracellularly, this results in an extremely bright signal on DWI. Other sequence types are within the scope of this disclosure.

Identification of MR sequence type and/or view can be very useful. For example, often a user may need to determine the sequence type and/or view of an image series for, for example, diagnostic purposes. This form of classification can also be highly useful for building large-scale imaging repositories that can receive submissions from heterogeneous data sources. Moreover, by design, image processing algorithms accept as input one or more specific image slices or image series of a given sequence type and/or view (an acquisition usually consists of multiple image slices grouped in one or more image sequences) for processing and/or analysis. Due to the way the image series are acquired and maintained, identifying particular sequence types (e.g., T1-weighted, Tt2-weighted, Flair, DWI, etc.) and/or view in a given study may not be straightforward. In many instances, this step of the workflow is a manual process, with the user identifying the relevant series for the algorithm.

The automation of series identification and selection is challenging for several reasons. Despite imaging acquisition protocols being generally to some degree standardized in most clinical practices, they are frequently tailored locally due to several reasons, such as expert preference, and scanner limitations, ultimately becoming specific to different scenarios. Series acquisition may also include manual interventions at the point of care (e.g., adapting protocols to patient history, using specific nomenclatures for protocol naming). Additionally, in the same institution, there is often significant heterogeneity in scanner manufacturer, model, and software versions. Due to these sources of variability, acquisition parameters and the associated metadata may vary from one patient to another, and even more so among different clinical practices or in the same institution across time.

The adoption of the Digital Imaging and Communications in Medicine (DICOM) international data standard for medical imaging by manufacturers has been a first step towards standardization. However, the lack of a uniform series naming scheme does not make it a reliable method for the automation of series identification or classification. For example, DICOM includes sequence data that includes variability over time, across manufacturers, variability due to modifications by radiologists, in-house protocol based variability, variability due to mixing of other types of information (e.g., contrast, orientation, etc.) with sequence information, or the like.

In the current disclosure, an annotation process (which may in some embodiments comprise multiple, parallel annotation processes as described) is applied to a set of training images, and each training image is labeled to include one or more of the following: an image type classification (e.g., T1-weighted, T2-weighted, STIR, and T2*-weighted), an image plane or projection classification (e.g., axial, sagittal and coronal), and a region of interest classification (e.g., an organ, tissue, etc.). These labels may be applied manually by, for example, having a radiologist or other skilled medical professional annotate the images, retrieved from metadata associated with the images (e.g., DICOM header) and/or from images previously labeled using the methods of this disclosure. These training images are then used to train a classifier to classify an input image to output the input image's weighting classification, image projection, and/or region of interest (ROI). The output can also be manually evaluated by a radiologist or other skilled medical professional for accuracy.

In FIG. 1, a general view of a setup of an MRI system 100 is depicted. The system 100 comprises an MR scanner 101. The MR scanner is operative to generate MM data by means of scanning a living object. The MR scanner is further connected to a computing device 103 for processing data generated by the scanner 101. The computing device comprises a central processor unit coupled to a memory and a number of input and output ports for receiving and outputting data and information. The computing device 103 receives input commands from one or several input devices generally represented by an input device 105. The input device may be one or many of a computer mouse, a keyboard, a microphone, or any other input device. The computing device 103 is further connected to a display 107 for visualizing the processed scanner data as a contrast image and/or other identified information. The MRI system 100 also includes a datastore 108 for storing MRI images, rule sets, classifiers, training data, or the like; that is accessible to the computing device 103. The MRI system can be made to operate, process, and display images in response to a computer program loaded into the memory of the system and executed by the computing device. The computer program can be stored on any (non-transitory) suitable storage media such as a ROM, a disc or similar. The components of the MM system 100 may be in communication via a network 110, where network 110 is any now or hereafter known communication networks including, for example, Internet, Intranet, Wi-Fi, cellular, Bluetooth, or the like.

The data store 108 stores images in a standard format such as a Digital Imaging and Communication in Medicine (DICOM) format. In the DICOM format, each image is stored together with metadata about the image such as, for example, in a DICOM header, series descriptor, or the like. For example, the header may include an Information Object Definition (IOD) made up of various Information Entity (IE) metadata attribute sets. For example, an MRI image stored in DICOM format may include the following information: patient attributes, pre-clinical or clinical study attributes, MRI scanner identification, series instance UID, series number, series description, protocol name, series time of acquisition, attributes of the MRI image such as pixels, image plane, weighting classification, date/time of acquisition, imaged organ, disease model, patient orientation, view (or image projection such as, sagittal or side view; coronal or front view; axial or cross-section view, and the like) slice thickness, magnetic contrast agent bolus identity (if any), and so forth.

Figure 2:
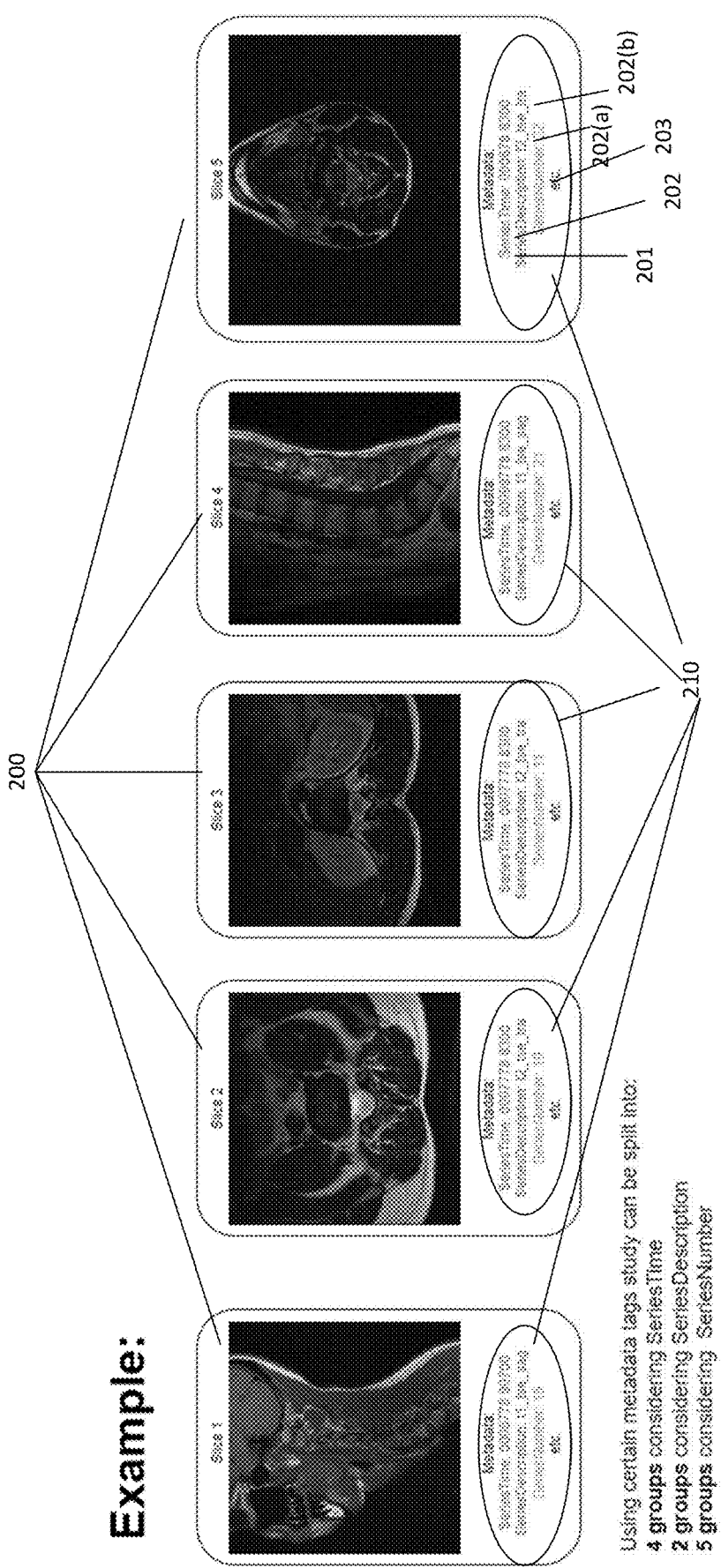
FIG. 2 illustrates example DICOM header images.

FIG. 2 illustrates example image slices 200, each of them associated with metadata 210 (e.g., DICOM headers). The example metadata shown in FIG. 2 includes the following information: a time of acquisition of an image (SeriesTime: 201), image description 202 (SeriesDescription including weighting 202(a) and plane information 202(b)), and an image series number (Series Number 203) that includes the corresponding image slice 200. It should be noted that while the disclosure describes use of information from the DICOM header for classification or labeling of the MM image, it is not so limiting. For example, metadata associated with MRI images in a NIFTI or another image format may be similarly used.

Figure 3:
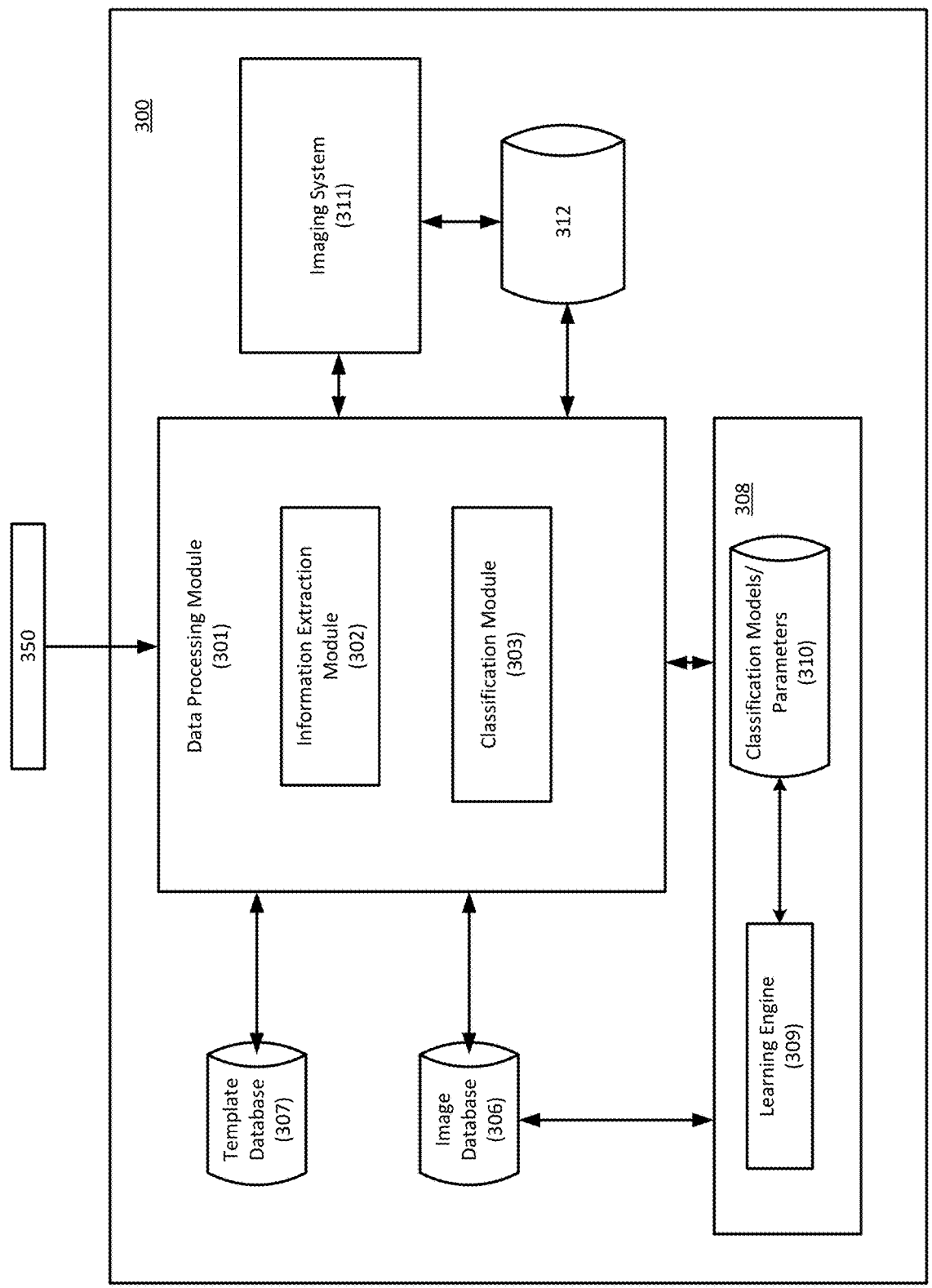
FIG. 3 illustrates a schematic representation of an example system for classifying MM images.

FIG. 3 illustrates a high-level block diagram of a system (300) for providing automated classification medical imaging in accordance with the current disclosure. In general, the exemplary system (300) comprises a data processing module (301) that implements various methods for analyzing medical image data (350) in one or more image slices or image series for generating a classification output. In the exemplary embodiment, the data processing module (301) comprises an information extraction module (302) and a classification module (303).

In general, the information extraction module (302) implements methods for automatically extracting one or more types of features/attributes/parameters from input medical image data and combining the extracted features/parameters in a manner that is suitable for processing by the classification module (303). The system (300) can process digital image data (10) in the form of raw image data, 2D-reconstructed data (e.g., axial slices), or 3D-reconstructed data (volumetric image data or multiplanar reformats), 4D-reconstructed data, or other image modalities/ formats. It is to be understood that methods implemented by the information extraction module (302) will vary depending on the image format (e.g., DICOM) as well as the methodologies implemented by the classification module and the type(s) of anatomical structures under consideration.

The classification module (303) implements methods for using the extracted features/parameters to automatically identify the patient view in an image, the sequence type of an image and/or anatomical regions (lumbar, cervical, brain, etc.) in the image dataset and label the image(s) with the appropriate determined identification(s). In various embodiments, the classification module (303) may also implement methods for determining (for each determined view/sequence type/anatomical label) a confidence or likelihood measure that the identified view, sequence type and/or anatomy is properly labeled. The results of view/sequence type/anatomical identification for a medical image can be used by other automated methods such as the view identification and quality assessment methods, or other application that provide automated diagnosis, therapy planning, etc.

The system (300) further comprises a database (306) of previously diagnosed/labeled medical images, a template database (307) and a classification system (308), which can be used by the classification module (303) to perform it's one or more labeling functions. For example, the classification module (303) can implement database querying methods to use extracted feature data to search for similar labeled cases in the database (306). The database (306) may comprise a plurality of labeled/diagnosed medical images for various clinical domains, which are indexed using a multidimensional indexing scheme based on relevant features/ parameters. In such instance, the features/parameters extracted from an image dataset under consideration can be compared to the feature data of known cases in the database (306) according to some metrics or criteria identify the particular view, sequence type and/or anatomy of the image extracted.

In another embodiment, the classification module (303) can implement template-based methods to use extracted feature data to search for similar templates in template database (307). In particular, various templates can be constructed using information obtained from the database of cases (306). For example, feature data over a plurality of known cases for a given view, sequence type and/or anatomy can be processed using statistical techniques to derive feature data for a template representative over the set of related cases. In this instance, the features/parameters extracted from an image dataset under consideration can be compared to the feature data for templates in the database (307) according to some metrics or criteria identify the particular view, sequence type and/or anatomy in an image.

In another embodiment, the classification module (303) can implement classification methods that utilize the classification module (308) to process extracted feature data to classify the image dataset under consideration. In the embodiment of FIG. 3, the classification module (308) comprises a learning engine (309) and knowledge base (110) including classification models, parameters, etc. to implement a principle (machine) learning classification system. The learning engine (309) includes methods for training/ building one or more classifiers using training data that is learned from the database (306) of previously diagnosed/ labeled cases. The classifiers are implemented by the classification module (303) for performing one or more functions.

For example, a bank of classifiers could be constructed to classify the images based on the features extracted. That is, a set of classifiers would be "learned" based on training data. These classifiers would use the set of features as an input, and classify the image as belonging to a particular anatomy, view, and/or sequence type.

A "machine learning model" or a "model" or a "classifier" refers to a set of algorithmic routines and parameters that can predict an output(s) for a process input (e.g., image classification, a diagnosis or treatment of a patient, a suitable recommendation based on a user search query, etc.) based on a set of input features, without being explicitly programmed. A structure of the software routines (e.g., number of subroutines and relation between them) and/or the values of the parameters can be determined in a training process, which can use actual results of the process that is being modeled. Such systems or models are understood to be necessarily rooted in computer technology, and in fact, cannot be implemented or even exist in the absence of computing technology. While machine learning systems utilize various types of statistical analyses, machine learning systems are distinguished from statistical analyses by virtue of the ability to learn without explicit programming and being rooted in computer technology. A neural network or an artificial neural network is one set of algorithms used in machine learning for modeling the data using graphs of neurons. Any network structure may be used. Any number of layers, nodes within layers, types of nodes (activations), types of layers, interconnections, learnable parameters, and/or other network architectures may be used. Machine training uses the defined architecture, training data, and optimization to learn values of the learnable parameters of the architecture based on the samples and ground truth of training data.

It is to be understood that the term "classifiers" as used herein generally refers to various types of classifier frameworks, such as neural network classifiers, hierarchical classifiers, ensemble classifiers, etc. In addition, a classifier design can include a multiplicity of classifiers that attempt to partition data into two groups and organized either organized hierarchically or run in parallel and then combined to find the best classification. Further, a classifier can include ensemble classifiers wherein a large number of classifiers all attempting to perform the same classification task are learned, but trained with different data/variables/parameters, and then combined to produce a final classification label. The classification methods implemented may be "black boxes" that are unable to explain their prediction to a user (which is the case if classifiers are built using neural networks, example). The classification methods may be "white boxes" that are in a human readable form (which is the case if classifiers are built using decision trees, for example). In other embodiments, the classification models may be "gray boxes" that can partially explain how solutions are derived (e.g., a combination of "white box" and "black box" type classifiers).

A typical machine learning pipeline may include building a machine learning model from a sample dataset (referred to as a "training set"), evaluating the model against one or more additional sample datasets (referred to as a "validation set" and/or a "test set") to decide whether to keep the model and to benchmark how good the model is, and using the model in "production" to make predictions or decisions against live input data captured by an application service. For training the model to be applied as a machine-learned model, training data is acquired and stored in a database or memory. The training data is acquired by aggregation, mining, loading from a publicly or privately formed collection, transfer, and/or access. Ten, hundreds, or thousands of samples of training data are acquired. The samples are from scans of different patients and/or phantoms. Simulation may be used to form the training data. The training data includes the desired output (ground truth), such as segmentation, and the input, such as protocol data and imaging data.

In some embodiments, the training set will be used to create a single classifier using any now or hereafter known methods (e.g., vision-based learning algorithms). In other embodiments, a plurality of training sets will be created to generate a plurality of corresponding classifiers. Each of the plurality of classifiers can be generated based on the same or different learning algorithm that utilizes the same or different features of the MRI images in the corresponding one of the pluralities of training sets. For example, each of the plurality of neural network models can be trained on a training set classified on sequence type, view type, anatomy type and/or other image classifying data as discussed in conjunction with the disclosure.

Once trained, the machine-learned or trained classifier is stored for later application. The training determines the values of the learnable parameters of the network. The network architecture, values of non-learnable parameters, and values of the learnable parameters are stored as the machine-learned network. Copies may be distributed, such as to MR scanners, for application. Once stored, the machine-learned network may be fixed. The same machine-learned network may be applied to different patients, different scanners, and/or with different imaging protocols for the scanning. The machine-learned network may be updated. As additional training data is acquired, such as through application of the network for patients and corrections by experts to that output, the additional training data may be used to re-train or update the training.

Referring to FIG. 3, the processing results generated by the various modules of the data processing module (301) can be persistently stored in a repository (312) in association with the corresponding image dataset. The processing results may comprise meta information for superposition of markers, segmentation, color, or intensity variations, and so forth, which can be rendered as overlays on the associated image data.

The system (300) further comprises an image rendering and visualization system (311) to process digital image data (350) of an acquired image dataset (or a portion thereof) and generate and display 2D and/or 3D images on a display device. More specifically, the imaging system (311) may be any application that provides 3D/2D rendering and visualization of image data (300). Optionally, the imaging system (311) comprises a GUI (graphical user interface), for example, which enables a user to navigate through a 3D image or a plurality of 2D slices.

The data processing system (301) (and modules within) and image rendering and visualization system (311) may be implemented as a single application that executes in a computing system (e.g., workstation). Alternatively, the systems (301) and (311) may be independent tools that are distributed over a computer network, wherein known communication protocols such as DICOM communication protocol, PACS (Picture Archive and Communication Systems), etc. are used for communicating between the systems and transmitting image data over the network.

It is to be appreciated that exemplary methods for automatic orientation, sequence type and/or anatomy labeling of an MRI image are powerful tools that provide substantial assistance and decision support in medical imaging acquisition and evaluation. Indeed, when medical images are acquired, it is important to properly label the images with proper patient orientation, sequence type and/or anatomy so that a physician can perform a proper diagnosis. As discussed above, currently labeling is done (or verified) manually, either by a technologist acquiring the scan, or by the physician. With exemplary labeling methods described herein, the system automatically identifies the orientation, sequence type and/or anatomy in an MRI image, which provide various advantages. For instance, automated anatomy identification improves physician workflow by eliminated manual labeling. Moreover, automated anatomy identification facilitates automated quality control, and other automated computer applications that aid in diagnosis, therapy planning, image processing algorithms, or other applications.

Figure 4:
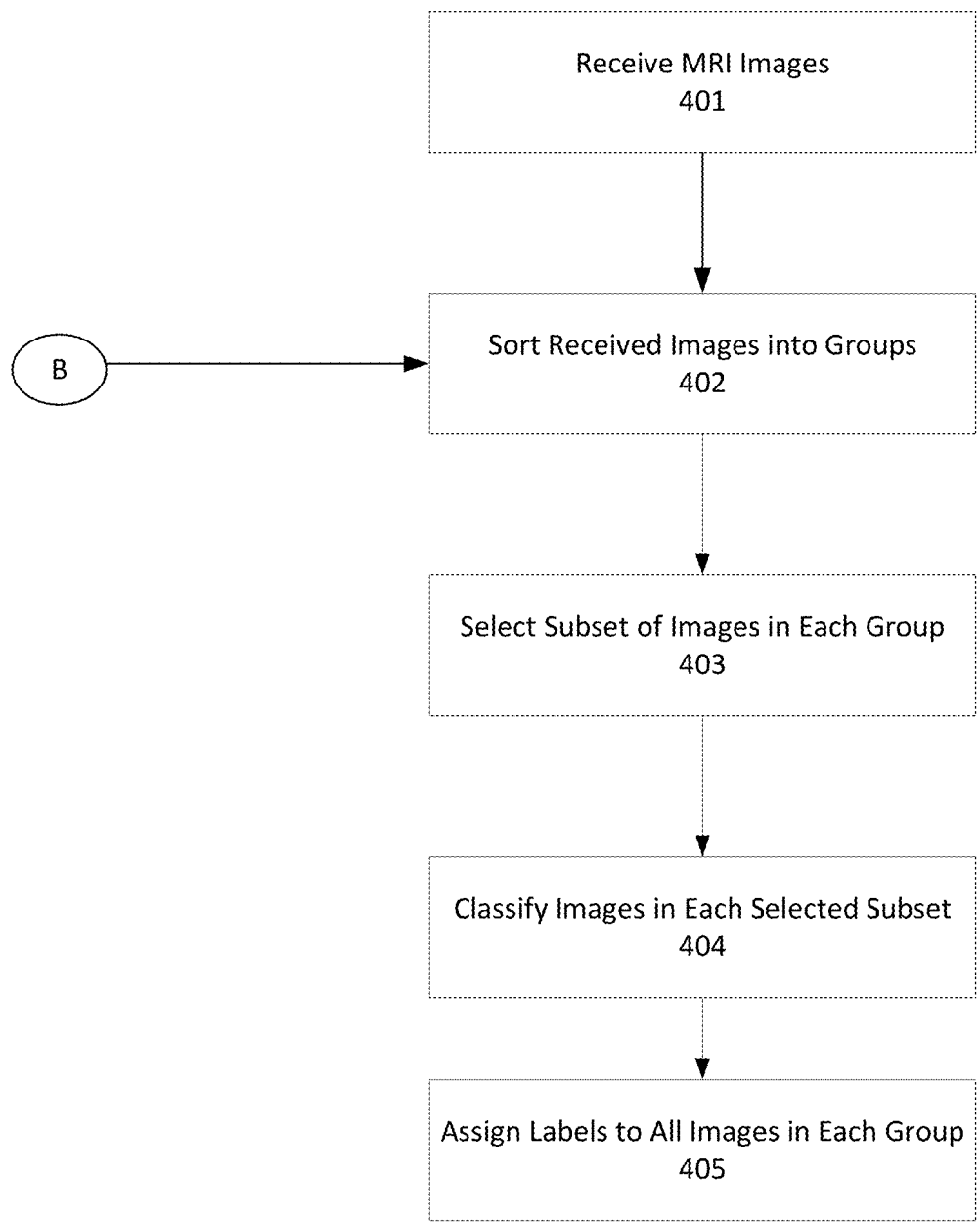
FIG. 4 illustrates an example method for classifying MM images.

Referring now to FIG. 4, a flowchart illustrating an example method for analyzing and classifying MM images is shown. As can be appreciated, the methods described herein may be carried out using a hardware device having circuits for performing one or more of the calculations or functions described herein. Other configurations for a computing apparatus are also within the scope of the present invention. It should be appreciated that not all of these steps are essential in all embodiments, and the order of the steps is non-limiting.

At 401, an image dataset (e.g., including MRI images) for analysis may be obtained from, for example, a use, an MR scanner and/or an image database. In various embodiments, the MRI images (or image slices) in an image dataset are associated with metadata (e.g., a DICOM header and/or information received therefrom).

Figure 5:
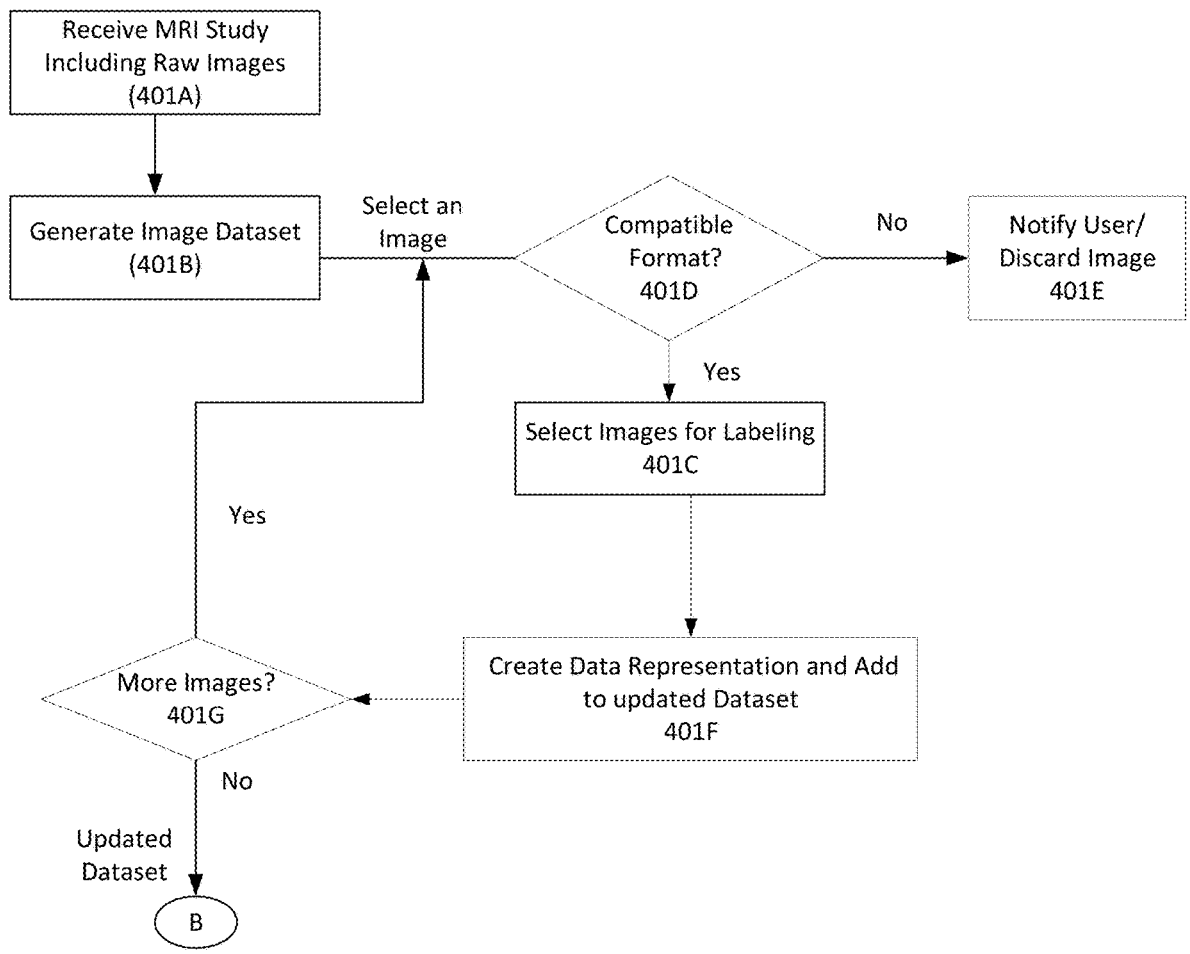
FIG. 5 illustrates an example method for pre-processing MRI images.

FIG. 5 is a flowchart illustrating the example sub-steps for performing one or more steps of FIG. 4. It should be appreciated that not all of these steps are essential in all embodiments, and the order of the steps is non-limiting. As shown in FIG. 5, step 401 may include, for example, the step of receiving a dataset comprising one or more raw medical images of a region of interest of a subject patient (step 401A) from a physician, clinician, radiologist, etc. The dataset may be obtained using a medical imaging system for real-time acquisition and processing of raw image data, such as raw MR data which is acquired during an MRI scan. The raw MR data may then be processed by the system to generate the image dataset or image files (step 401B). The image dataset may comprise one or more 2D slices or three-dimensional volumetric image slices, which are reconstructed from the raw image data and stored in a data store. In other words, image data can be 2D (e.g., 2D MRI image slices), 3D (e.g., 3D MM image slices), 4D (Dynamic 3D MM), etc.

Optionally, the image dataset may be obtained by accessing (e.g., by a user) a data store including previously acquired, and persistently stored image dataset.

The term "image sequence" or "image series" is used to refer to the set of images produced by a single scan including one or more images. Metadata that is provided with images when they are received by the system are not always complete or accurate, and therefore the system can add or improve the metadata values associated with an image using the embodiments of this disclosure.

At 401C, the system may select one or more images from the image dataset for labeling by analyzing each image in the image dataset for compatibility. Optionally, the system only performs steps 402-404 of FIG. 4 if the received images are in a format compatible with the system.

Specifically, the system may determine whether an image of the image dataset are in a format compatible with the system (step 401D). For example, if the system requires the format to be a DICOM format, it can search for previously known identifiers of DICOM format such as, without limitation, file name, file name extension, tags, header location, data format in the header, or the like to determine whether the received image is in the DICOM format.

There are 6 predominant formats for radiology images—DICOM, NIFTI (Neuroimaging Informatics Technology Initiative), PAR/REC (Philips MRI scanner formats), ANALYZE (Mayo Medical Imaging), NRRD (Nearly Raw Raster Data) and MNIC. The main difference between DICOM and NIFTI is that image data in NIFTI is saved as a 3D image, whereas DICOM images are stored as 2D image slices. This makes NIFTI preferable for some machine learning applications over DICOM, because it is modeled as a 3D image. On the other hand, DICOM may be preferable for application as rendering and display on a 2D display device. As such, in various embodiments, images in one or more of these formats (e.g., NRRD, NIFTI, etc.) may be deemed incompatible depending on, for example, the eventual use of the labeled images, the training data used for generating the classifier (e.g., a DICOM format may be preferred if DICOM images are used for generating the classifier), user instructions, system configurations, or the like. If the image is determined to be in a format that is compatible with the system (401D=YES), the system may select the image for further labeling. Optionally, the selected image may be added to an updated image dataset as a data representation including metadata information associated with the image (401F).

Optionally, the system may output an error message if the received images are not in a format compatible with the system and discard that image (401E). Additionally, and/or alternatively, the system may transform such incompatible images to a format compatible with the system using any now or hereafter known methods. The steps 401C-F may be repeated until all the images in the received dataset have been analyzed (401G).

Referring to FIG. 4, the MRI images in the received dataset may be sorted into one or more groups such that each group potentially similar images (402). For example, images may be sorted into groups based on metadata such as DICOM header attributes (or tags) associated with the MM images. Examples of DICOM header attributes may include, without limitation, series instance UID, series number, series description, protocol name, series, acquisition time, view, or orientation, or the like, and combinations thereof. For example, in one or more embodiments, when acquisition time is used for sorting, each group may include images that have a time of acquisition that is the same and/or within a predetermined time range (such as 2 seconds, 3 seconds, etc.).

In some other embodiments, images may be sorted into groups based on, for example, image attributes such as, without limitation, the corresponding weighting classification (e.g., T1 images are grouped together in a first group, T2 images are grouped together in a second group, FLAIR images are grouped in a third group, etc.), the view or projection information (e.g., sagittal images are grouped together in a first group, coronal images grouped together in a second group, and axial images grouped together in a third group), the serial number of associated image series (e.g., images from the same series may be grouped together (e.g., images with Series Instance UID='123.45.6' belong to Series number 1, all images with Series Instance UID='123.45.7' belong to Series number 2, etc.), images from neighboring series may be grouped together, etc.), the image slice information, the patient orientation, etc.; or combinations thereof. Image attributes may be retrieved from, for example, the DICOM header or other metadata associated with the image.

In various embodiments, one or more of the attributes may be given more preference for sorting the images into groups over one or more other attributes (e.g., based on user instructions). In various embodiments, the attribute selected for sorting the images into groups maybe an attribute that yields the maximum number of image groups. For example, use of the time of acquisition yields 6 groups of images and use of the serial number yields 4 groups of images, the system will use the time of acquisition for sorting the images into groups. Often one or more of the DICOM header attributes may not be present in an image and, optionally, the system may use the DICOM header attribute(s) that is included in a majority (or all) of the images. In some embodiments, a first attribute may be used to sort the images into first groups, and a second attribute may be used to further sort images in one or more of the first groups into sub-groups (e.g., to increase the number of groups).

In some embodiments, each group may include about 15-30 images, about 20-25 images, or the like. Optionally, in some embodiments, the received dataset may not be divided into groups.

Next, at 403, a subset of images is selected from each group of images for labeling based on one or more attributes of the images in the group. For example, the subsets may be created based on the attributes associated with the images such as, without limitation, the time of acquisition, the weighting sequence type, the view information, the plane information, the serial number of associated image series, the image slice number information, etc., or combinations thereof. For example, a sequence type that is associated with the maximum number of images may be used for selection of the subset, and some or all the images that have that sequence type may be selected from the group. Optionally, the attribute(s) that is used for sorting the images into groups in step 402 may also be used for selecting the subset of images as well.

In various embodiments, selection of the subset may, optionally, include determining a median value for an attribute(s) of the images and selecting "n" (e.g., n=1, 3, 5, 7, etc.) number of images closest to the median value for that attribute(s). In other words, the selection of the images for the subset is done such that an odd number of images are selected. For example, if a subset of images including 5 images is to be selected based on the time of acquisition, and the median time of acquisition for the group of images is "T", then N (e.g., 5) images that have a time of acquisition that is closest to T may be selected.

In another example, patient orientation may be used to create the subset of images by selecting the images that lie within a certain pixel distance of the center of the imaging plane. Specifically, an Image Position type specifies the x, y, and z coordinates of the upper left hand corner of the image; it is the center of the first voxel transmitted. An Image Orientation type specifies the direction cosines of the first row and the first column with respect to the patient. These attributes may be provided as a pair in the DICOM header. Row value for the x, y, and z axes respectively followed by the Column value for the x, y, and z axes respectively. As such, in a DICOM header, patient orientation (x,y,z) relative to the image plane is specified by six values that designate the anatomical direction of the positive row axis (left to right) and the positive column axis (top to bottom). The first entry is the direction of the rows, given by the direction of the last pixel in the first row from the first pixel in that row. The second entry is the direction of the columns, given by the direction of the last pixel in the first column from the first pixel in that column. This patient orientation may be used to select a subset of images that lie within a certain pixel distance of the imaging plane. It should be noted that the desired number of images that are closest to the center of the imaging plane may be selected.

A pre-trained classifier or machine learning model may then be used to assign at least one label to each of the MM images in each subset of each group of MRI images (304). The classifier may analyze the image and may output an image label for each image in the subset. More than one label may be output for each image such as, without limitation, a weighting classification label, a view classification label, and/or an anatomy classification label.

Optionally, one or more labels may be determined from the image metadata (e.g., DICOM header). For example, the view information may be determined from the DICOM header (e.g., IE or tag including tag ImageOrientationPatient), which is then used for outputting the anatomy classification label using a classifier. The view and anatomy information may then be used by a classifier to output a sequence type label. In another embodiment, the view information and the classification label may be determined from the DICOM header and used for outputting the anatomy classification label using a classifier. In some other embodiments, the classifier first outputs a view classification and/or an anatomy classification, which is then used for outputting the anatomy classification label using a classifier. However, this order for determining the classification(s) is exemplary and the sequence type may be determined first followed by anatomy classification and/or the view classification.

At 305, prediction voting may be used to assign the same image label to all the images in a group. For example, a label assigned to all the images in a group is the predicted label for the maximum number of MM images in the subset of images chosen for that group. For example, if a subset selected from a group includes 5 images, and 4 out of the 5 images have a T1-weight predicted label, all the images in that group will be assigned a label of T1-weight. Similarly, if that subset of 5 images includes 3 images having a sagittal view predicted label, all the images in that group will be assigned a label of sagittal view. In one example, a medical imaging dataset may include a volumetric 3D imaging dataset that includes a region of interest, such as a brain. The classifier may apply a recognized region tag (e.g., a brain tag) to the volumetric dataset, along with other applicable tags, such as a sequence type tag and a view type tag.

Optionally, the system may create a data representation of each image that includes the corresponding predicted label(s) and add the data representation to a data store. Optionally, the predicted label(s) may be used for further processing of the images such as, for example, selection of images having a particular label (e.g., for display), updating of the DICOM header, selection of images for input to an image processing algorithm (e.g., a diagnostic algorithm), for retraining of the classifier, or the like. In various examples, the data representation may be used for rendering the image on a display device with the appropriate labels (e.g., shown as text, color renderings, grayscale rendering, etc.).

The process may be repeated until all (or a desired number of) images in an MRI dataset are labeled (406).

The systems and process herein can be used for various control, display, or subsequent detection or analysis systems to improve performance, utility, or operation of MM imaging.

Figure 6:
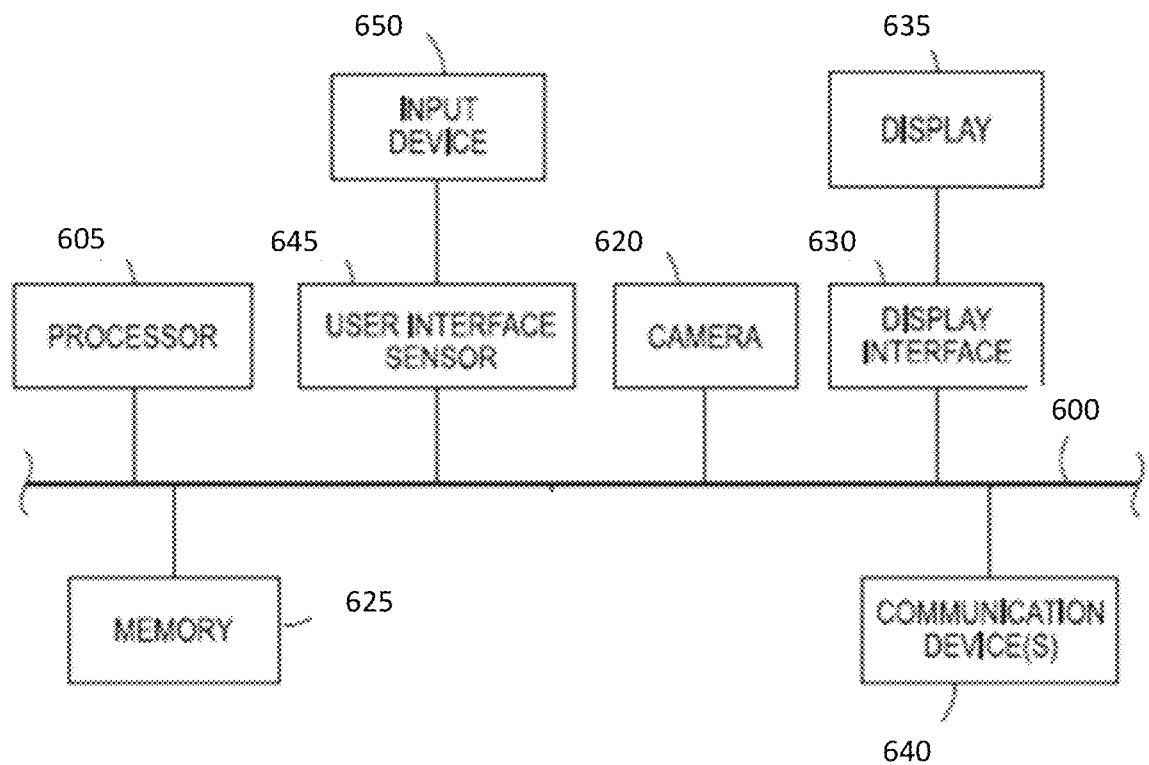
FIG. 6 is a block diagram that illustrates various elements of a possible electronic subsystem and/or external electronic device

FIG. 6 depicts an example of internal hardware that may be included in any of the electronic components of the system, such as internal processing systems of the autonomous vehicle or remote servers. An electrical bus 600 serves as an information highway interconnecting the other illustrated components of the hardware. Processor 605 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 625. A memory device may include a single device or a collection of devices across which data and/or instructions are stored. Various embodiments may include a computer-readable medium containing programming instructions that are configured to cause one or more processors to perform the functions described in the context of the previous figures.

An optional display interface 630 may permit information from the bus 600 to be displayed on a display device 535 in visual, graphic, or alphanumeric format, such on an in-dashboard display system of the vehicle. An audio interface and audio output (such as a speaker) also may be provided. Communication with external devices may occur using various communication devices 650 such as a wireless antenna, a radio frequency identification (RFID) tag and/or short-range or near-field communication transceiver, each of which may optionally communicatively connect with other components of the device via one or more communication system. The communication device(s) 650 may be configured to be communicatively connected to a communications network, such as the Internet, a local area network or a cellular telephone data network.

The hardware may also include a user interface sensor 655 that allows for receipt of data from input devices 650 such as a keyboard or keypad, a joystick, a touchscreen, a touch pad, a remote control, a pointing device and/or microphone. Digital image frames also may be received from a camera 620 that can capture video and/or still images. The above-disclosed features and functions, as well as alternatives, may be combined into many other different systems or applications. Various components may be implemented in hardware or software or embedded software. Various presently unforeseen or unanticipated alternatives, modifications, variations, or improvements may be made by those skilled in the art, each of which is also intended to be encompassed by the disclosed embodiments.

Terminology that is relevant to the disclosure provided above includes:

The term "image series" refers to any two or more images that are related. Images in a series typically share one or more common attributes, for example, a type of anatomic plane and/or an image orientation. For example, an image series may comprise two or more images of a particular patient that are acquired on a particular date, e.g., different MRI projections. An MRI scan (e.g., a lumbar spine MRI) might include the following series: sagittal T1 weighted images, axial T1 weighted images, axial FLAIR images, axial T2 weighted images, as well as post contrast axial, sagittal and coronal T1 weighted series. An image series of an exam may be identified by its "type" (also referred to herein as a "series type" and/or a "view type"). For example, series may be acquired using different pulse sequences, acquired in different anatomic planes (also referred to herein as "imaging planes"), and/or acquired before or after administration of intravenous contrast material.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions, such as a microprocessor or other logical circuit. A processor and memory may be elements of a microcontroller, custom configurable integrated circuit, programmable system-on-a-chip, or other electronic device that can be programmed to perform various functions. Except where specifically stated otherwise, the singular term "processor" or "processing device" is intended to include both single-processing device embodiments and embodiments in which multiple processing devices together or collectively perform a process.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

In this document, when relative terms of order such as "first" and "second" are used to modify a noun, such use is simply intended to distinguish one item from another and is not intended to require a sequential order unless specifically stated.

The invention claimed is:

1. A method of performing image classification, the method comprising, by a processor:
   receiving a plurality of magnetic resonance imaging (MRI) images, each of the plurality of images comprising metadata;
   sorting, using the metadata, the plurality of images into one or more groups; and
   for each of the one or more groups:
   identifying a subset of images;
   generating, using a classifier, for each image in the subset of images, a classification label;
   identifying a first classification label, the first classification label being associated with a maximum number of images in the subset of images; and
   assigning the first classification label to each image in that group;
   wherein identifying the subset of images comprises selecting images that lie, based on a corresponding patient orientation, within a threshold pixel distance of an imaging plane corresponding to the group of images.

2. The method of claim 1, wherein the classification label comprises at least one of the following: a sequence type label, an anatomy label, or a view type label.

3. The method of claim 1, wherein the metadata is retrieved from a DICOM header of that image.

4. The method of claim 1, wherein sorting the plurality of images into one or more groups comprises sorting the images such that each image in a group includes an attribute value that is either similar to corresponding attribute values of other images in the group or within a threshold of the corresponding attribute values.

5. The method of claim 4, wherein the metadata comprises one or more of the following attributes: patient attributes, pre-clinical or clinical study attributes, MRI scanner identification, series instance UID, series number, series description, protocol name, series time of acquisition, image pixels, image plane, weighting classification, time of acquisition of image, imaged organ identification, disease model, patient orientation, view type, slice thickness, or bolus magnetic contrast agent bolus identity.

6. The method of claim 4, wherein identifying the subset of images comprises:
   determining a median attribute value of an attribute for images included in that group; and
   selecting images that are within a threshold distance of the median attribute value.

7. The method of claim 4, further comprising selecting an attribute for sorting the plurality of images into one or more groups, the selected attribute being configured to maximize a number of the one or more groups.

8. The method of claim 1, wherein the subset of images comprises an odd number of images.

9. The method of claim 1, further comprising identifying and discarding, one or more of the plurality of images that are in a format that is not DICOM compatible.

10. The method of claim 1, further comprising storing, in a data representation, the first classification label in association with each image in that group.

11. A system for performing image classification, the system comprising:
   a processor; and
   a non-transitory computer readable medium comprising programming instructions that when executed by the processor will cause the processor to:
   receive a plurality of magnetic resonance imaging (MRI) images, each of the plurality of images comprising metadata;
   sort, using the metadata, the plurality of images into one or more groups; and
   for each of the one or more groups:
   identify a subset of images,
   generate, using a classifier, for each image in the subset of images, a classification label,
   identify a first classification label, the first classification label being associated with a maximum number of images in the subset of images; and assign the first classification label to each image in that group;
wherein identifying the subset of images comprises selecting images that lie, based on a corresponding patient orientation, within a threshold pixel distance of an imaging plane corresponding to the group of images.

12. The system of claim 11, wherein the classification label comprises at least one of the following: a sequence type label, an anatomy label, or a view type label.

13. The system of claim 11, wherein the metadata is retrieved from a DICOM header of that image.

14. The system of claim 11, wherein the instructions that cause the processor to sort the plurality of images into one or more groups comprise instructions to cause the processor to sort the images such that each image in a group includes an attribute value that is either similar to corresponding attribute values of other images in the group or within a threshold of the corresponding attribute values.

15. The system of claim 14, wherein the metadata comprises one or more of the following attributes: patient attributes, pre-clinical or clinical study attributes, MRI scanner identification, series instance UID, series number, series description, protocol name, series time of acquisition, image pixels, image plane, weighting classification, time of acquisition of image, imaged organ identification, disease model, patient orientation, view type, slice thickness, or bolus magnetic contrast agent bolus identity.

16. The system of claim 14, wherein the instructions that cause the processor to identify the subset of images comprise instructions to cause the processor to:
determine a median attribute value of an attribute for images included in that group; and
select images that are within a threshold distance of the median attribute value.

17. The system of claim 14, further comprising instructions to cause the processor to select an attribute for sorting the plurality of images into one or more groups, the selected attribute being configured to maximize a number of the one or more groups.

18. The system of claim 11, further comprising instructions to cause the processor to identify and discard, one or more of the plurality of images that are in a format that is not DICOM compatible.

19. The system of claim 11, further comprising instructions to cause the processor to store, in a data representation, the first classification label in association with each image in that group.

* * * * *